Nov. 4, 1952 H. AHLMEYER ET AL 2,616,341
CARTON FOLDING APPARATUS AND METHOD
Filed Sept. 30, 1947 10 Sheets-Sheet 1

Fig. 1a

INVENTORS
HEINZ AHLMEYER
WHITNEY D. SHERMAN
BY W. Philips Churchill
ATTORNEY

INVENTORS
HEINZ AHLMEYER
WHITNEY D. SHERMAN
BY
ATTORNEY

Nov. 4, 1952  H. AHLMEYER ET AL  2,616,341
CARTON FOLDING APPARATUS AND METHOD
Filed Sept. 30, 1947  10 Sheets-Sheet 8

INVENTORS
HEINZ AHLMEYER
WHITNEY D. SHERMAN
BY
ATTORNEY

Patented Nov. 4, 1952

2,616,341

UNITED STATES PATENT OFFICE 2,616,341

CARTON FOLDING APPARATUS AND METHOD

Heinz Ahlmeyer, Tappan, and Whitney D. Sherman, West Nyack, N. Y., assignors to Robert Gair Company, Inc., New York, N. Y., a corporation of Delaware Application September 30, 1947, Serial No. 777,032

15 Claims. (Cl. 93—37)

This invention relates to method and apparatus for folding cartons, and more particularly cartons of the bottle carrier type designed to carry four, six or more bottles.

Improved forms of such cartons are shown and described in the copending application of Arthur J. Weiss, Serial No. 707,421, filed November 2, 1946. A principal object in the design of such cartons has been to manufacture them from a single blank of cardboard, paper board or similar material with as little waste of material as possible. At the same time, of course, it has been necessary to make adequate provision for strength and to reinforce the portions of the carton subjected to the most stress in use. The forms of cartons shown in said Weiss application achieve these objects.

The present invention relates to apparatus for folding or forming cartons of this type of construction from a single blank of sheet material by a series of operations to produce a product in finished form at a high rate of speed. The type of carton described in said Weiss application has to be folded in a manner which is very difficult to perform by hand and a principal object of our invention is to provide apparatus and a method for performing this difficult folding operation effectively in as few stages as possible and at a high rate of speed.

A further object of the invention is to provide such apparatus which is fully automatic in its operation so that the blanks fed in at one end of the machine, emerge at the other end in completely folded condition ready for use by a customer.

A still further object of the invention is the provision of such an apparatus which performs a complete folding operation in only four main stages.

These and other objects and advantages of the invention will be explained and will be apparent from the following description of the preferred embodiment of the apparatus illustrated in the accompanying drawings, in which Figures 1a, 1b and 1c arranged in tandem show a side elevation view of the complete folding machine.

Figures 10 and 11 are transverse sectional views on an enlarged scale showing the folded carton at different stages, and taken approximately on the lines 10—10 and 11—11, respectively, of Figure 1a.

Fig. 13 is a plan view of a blank of sheet material folded, cut and scored in the form in which it is fed into the machine.

The apparatus illustrated is designed particularly for folding a blank into a carton, the blank and carton having a construction such as shown in Figures 11 to 19 in said Weiss application.

Figure 1A:
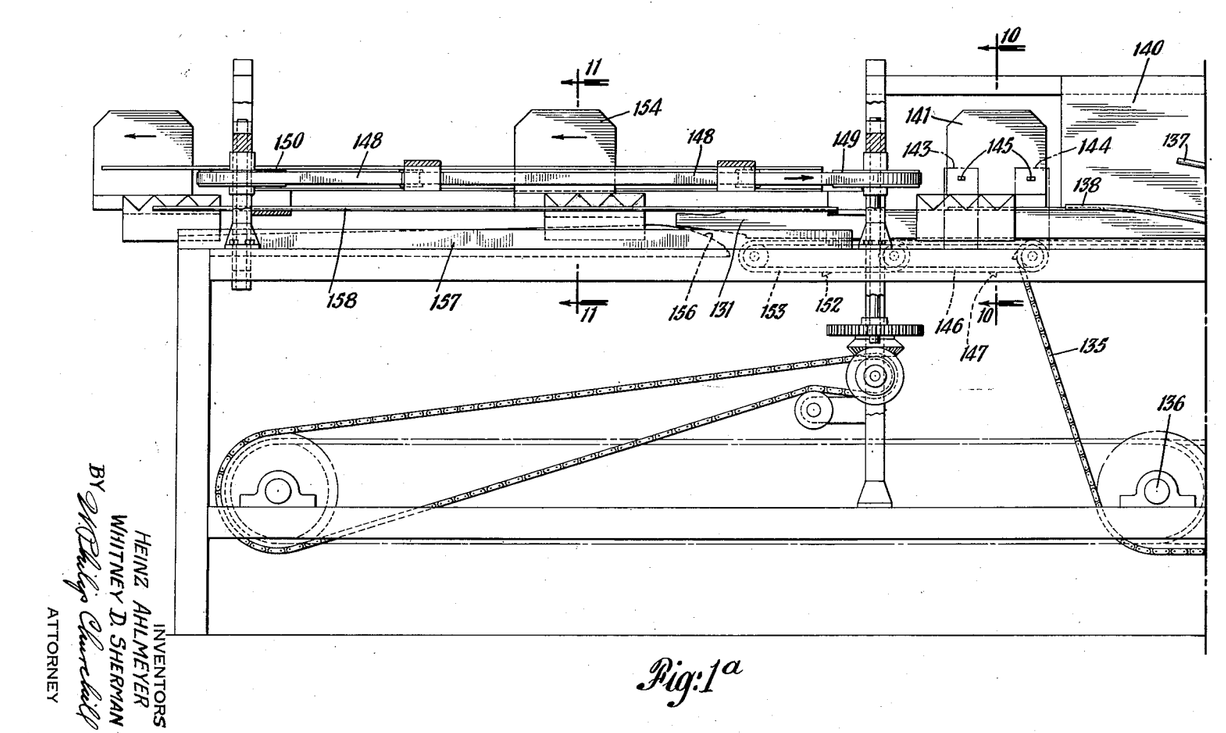
Figures 1C, 13:
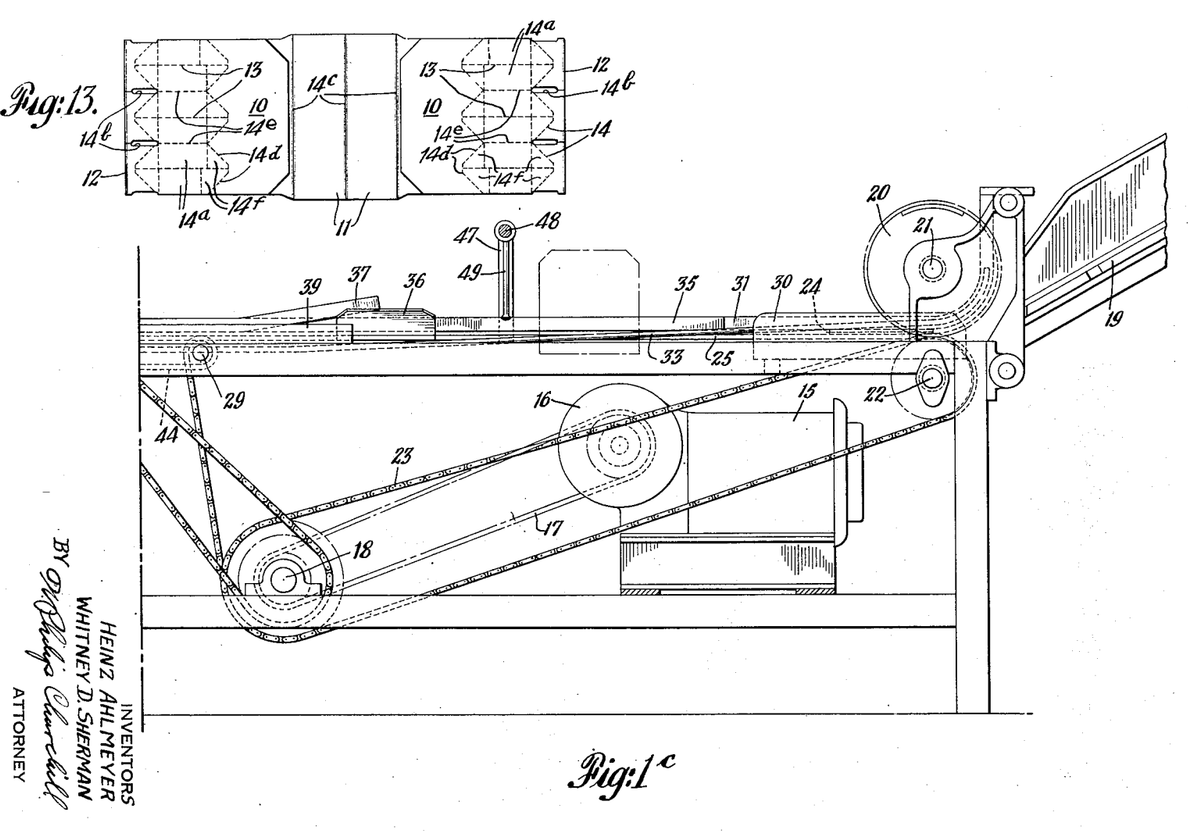

The blank as fed to the folding machine of our invention is preferably folded with the outermost end or handle sections 10 doubled over against the central portion 11 of the blank as shown in Fig. 13 and held in that folded position by spots of glue 12 inside and adjacent the two fold lines thus formed. The simple rectangular sheet after scoring and cutting may be folded into this form on any conventional or other suitable folding apparatus or gluer which does not constitute a part of our invention.

Adjacent these folds, the central section of the blank is provided with the short longitudinal cut lines 13 and the various short scores lines indicated at 14. Thus, each end section 10 of the blank is connected to the central section by six short strips 14a. At and extending through the folds, the blank is cut out to provide the slots 14b. The details and purposes of this construction are more fully described in said Weiss application. Also, the central portion of the blank may be provided with three transverse score lines indicated at 14c.

The machine of our invention may be driven by several independent motors or, as illustrated, may be driven entirely from a single motor 15 through a suitable gear reduction unit 16, belt drive 17 and the main drive shaft 18 together with various other auxiliary drive shafts connected thereto by chains and sprockets.

The blanks for the machine with the ends folded over and held in this position by glue, as shown in Fig. 13, may be stacked, with the end or handle sections uppermost, on an inclined delivery or guide board 19, so that the blanks slide down and come in contact one by one with the constantly rotating wheels 20, 20 fixed to the shaft 21. Shaft 21 may be geared to the shaft 22 which is driven directly from the main drive shaft 18 by the chain 23. The wheels 20, 20 rotate at a constant speed, and segments of their surfaces are provided with suitable friction material to catch the blanks from the slide 19 and feed them into the machine one at a time, as will be understood by those skilled in the art. Numeral 24 indicates a blank in the position it takes when it is first fed into the machine.

The blanks at this stage rest upon two relatively wide, flat plates or main guides 25, 25 and a central plate or guide 26, the upper surface of which is on a line with the surfaces of the main guide plates 25, 25.

It will be apparent that the blank is symmetrical, that is, it is scored and cut in the same manner on each side of the central score line extending transversely across the middle of the blank. The folding operations at the first two main stations, therefore, are performed simultaneously and are the same for each side of the blank.

Figure 4:
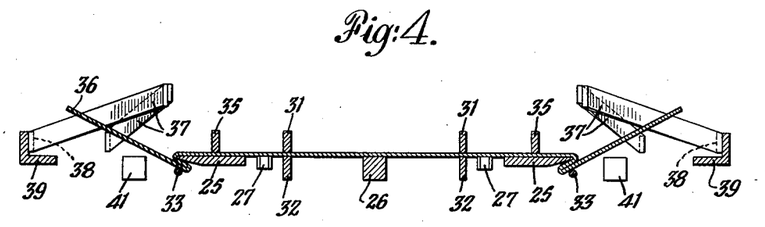
Figures 4 and 5 are partial transverse sectional views on a larger scale to show the folding operations, taken, respectively, on the lines 4—4 of Figure 2c and 5—5 of Figure 2b.
Figure 5:
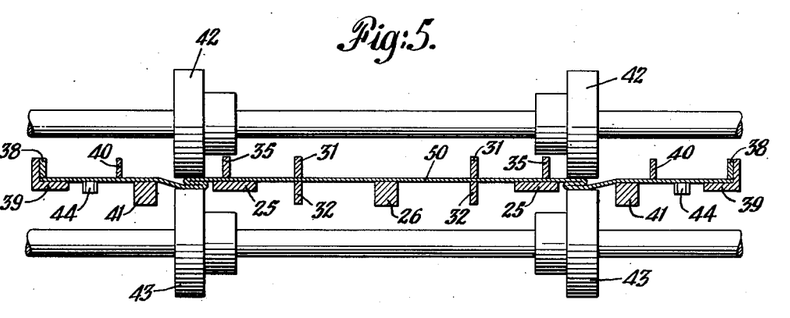

Referring generally to Figures 1c, 2c, 4 and 5, the first main station or folding operation involves the folding of the end or handle sections of the blank about transverse score lines to a position such that the ends of the blank extend straight out from the central portion thereof, as shown in Fig. 5. This operation involves rotation of the ends of the blank through an angle of approximately 180° about transverse score lines spaced inwardly of the blank a short distance from the glued folds.

In Fig. 4, the blank shown has been partly folded to this position, and in Fig. 5 the blank shown has been completely folded to the new position.

During this operation, the blank is fed through the machine at a constant rate of speed by means of the chains 27, 27 which are provided at intervals with suitable up-raised dogs 28 bearing against the rear edge of the blank. Thus a blank entering the machine by passing under the wheels 20, 20 is picked up by a pair of the dogs 28 on the chains 27, 27 and carried through the first folding operation. The chains 27, 27 are driven directly from the main shaft and pass around suitable sprockets on that shaft and also sprockets on the shaft 22 and the shaft 29. As the blank is received in the machine, it is centered on the main guides 25, 25 and central guide 26 by suitable fixed side plates 30. At this point, the central section of the blank passes underneath the fixed upper guide bars 31, 31 and above their complemental lower guide bars 32, 32 (see Figs. 4 and 5).

The outermost folded and glued edges of the blank 24 at this position are located underneath the fixed folding rods 33, 33. These rods 33, 33 at the feed end of the machine are disposed above the outer folded ends of the blank, but looking toward the delivery end of the machine are inclined inwardly and downwardly (see Figs. 1c and 2c) to perform the first folding operation. As the blank 24 is advanced by the chains 27, 27, the outer edges of the main guide plates 25, 25 coincide with score lines on the blank about which the fold is to be made. Thus, as the blank advances and the outer ends are pressed down by the inclined folding rods 33, 33, the handle or end portions of the blank are raised gradually until they reach a vertical position when the blank arrives at the position in the machine indicated by the numeral 34. As the handle portions of the blank are raised, the portions of the blank above the main guide plates 25, 25 pass under suitable fixed hold down guide rods 35, 35, the forward ends of which may be inclined to help clear the handle portions of the blank as they are raised at the beginning of the folding movement.

Movement of the blank beyond the position indicated by the numeral 36 continues the folding operation to rotate the handle portions of the blank outwardly (see Fig. 4). At this stage, the outward folding operation may be assisted by fixed inclined upper guide bars 37, 37 which help to press down the outer end portions of the blank and thus complete their rotation through an angle of 180°. As will be seen in Fig. 4, the main guide plates 25, 25 may have their outer edges sharpened to assist this folding operation.

As the blank passes the position 36 and the folding operation is completed, the outermost ends of the handle portions of the blank are guided under and held down by the upper guide bars 38, 38 against the lower angle iron guide plates 39, 39 and by the upper guide bars 40, 40 against the lower guide plates 41, 41. The guide bars 38, 38 and 40, 40 are simple extensions of the inclined guide bars 37, 37. At this stage the blank has been given an additional fold so that it is relatively flat but folded in a flattened or squashed S shape at two points spaced from the ends of the blank. This folding operation may be completed by the upper rollers 42, 42 and the lower rollers 43, 43, which crease the folds and may be driven in any suitable manner, if desired. The guide plates 25, 25 have their outer portions cut away to permit the creasing rollers 42 and 43 to complete this first folding operation.

By this time the chains 27, 27 have finished their feeding operation and the blank is being fed forward at the same rate of speed by the chains 44, 44 which pass around sprockets on the driven shaft 29 and the idler shaft 45. The feeding of the blank is performed in a similar fashion by suitable dogs 46 on the chains 44, 44.

Figure 2:
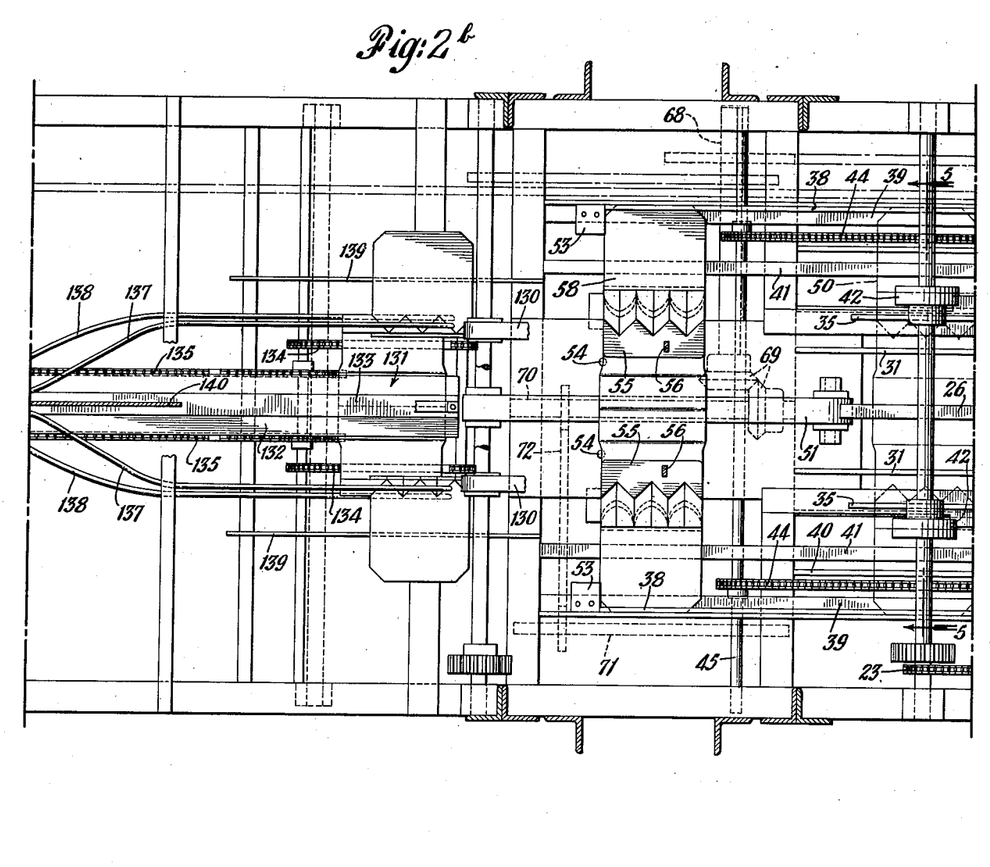
Figures 2a, 2b and 2c arranged in tandem show a plan view of the complete machine.

The various lower guides or plates may be fixed to the frame of the machine by bolts, welding or in any suitable fashion desired. In order to hold the upper guides in fixed relation thereto so that the blank will be held in correct position and still slide freely between the upper and lower guides, various braces may be used at proper intervals, one of which is illustrated in Figs. 1c and 2c. This brace consists of arms 47, 47 fixed to, extending upward from the sides of the frame of the machine and supporting the fixed transverse shaft or bar 48. Welded or otherwise secured to the bar 48 and to the guides to be supported are any form of suitable bracing means such as the short rods illustrated at 49 (Fig. 1c).

The blank with the flattened double fold rolled down by the creasing rollers 42 and 43 is designated in that position on the machine by the numeral 50. As the blank is fed forward by the chains 44, 44 and leaves the rollers 42 and 43, the blank is advanced rapidly by a lower friction belt 51 in cooperation with an upper friction belt 52 located in the center of the machine. These two belts travel at the same speed as each other, and that speed is about two to two and one-half times the forward speed of the chains 44, 44.

Hence, these belts feed the blank very quickly to a folding station in the central part of the machine where forward movement of the blank is stopped and several operations are performed successively to form the bottle pockets before the blank advances again.

The upper guides 40, 40 and 31, 31 as well as the folding rods 33, 33 terminate before the blank enters this central folding station (see Fig. 2b). The blank is quickly carried forward by the belts 51 and 52 until the forward edges of the outer ends of the blank strike the fixed plates 53, 53 which serve to position it properly for the next operations.

Figure 3:
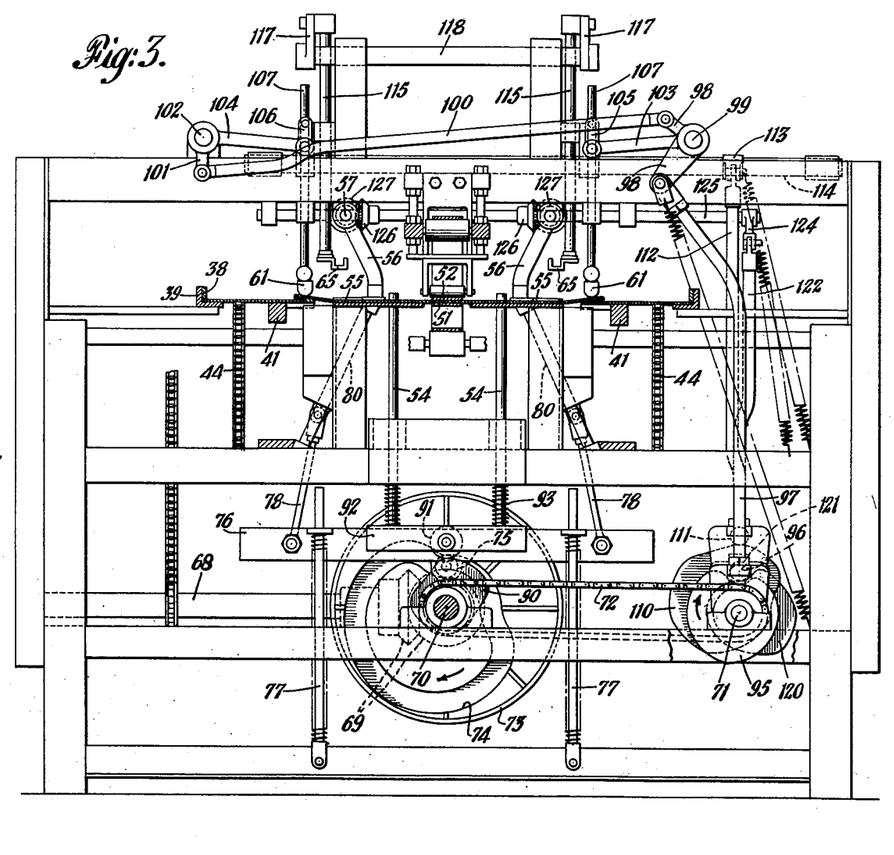
Figure 3 is a transverse sectional view through the machine, taken approximately on the line 3—3 of Figure 1b.
Figure 6:
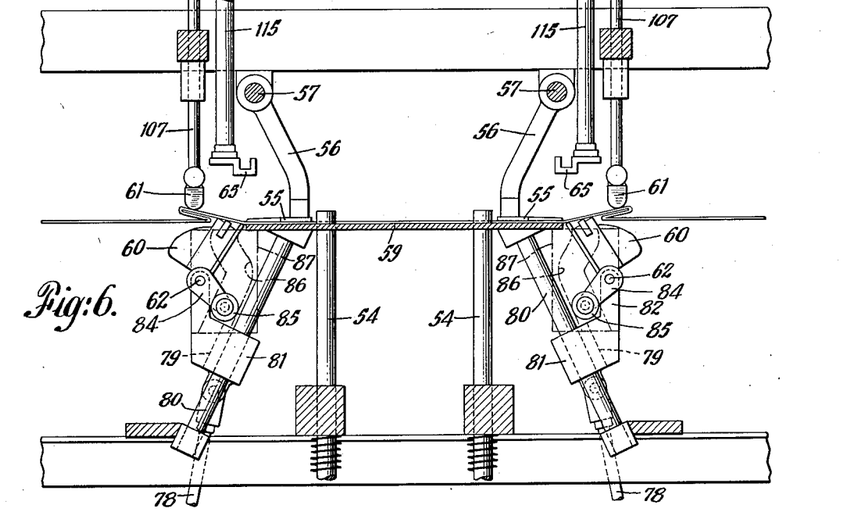
Figures 6, 7, 8 and 9 are fragmentary transverse sectional views showing, on an enlarged scale, different operating positions of the central portion of the folding apparatus shown more completely in Figure 3.

As the blank arrives at this folding station, two centrally located rods or stops 54, 54 are in a raised position and also serve to position and prevent further forward movement of the blank. Immediately, the blank arrives in proper position at the folding station, the hold down plates 55, 55 fixed to arms 56, 56, which in turn are fixed to stub shafts 57, 57, are rotated into position to hold or clamp the central section of the blank against the fixed base plate 59 during the subsequent folding operations. This holding or clamping position of the plates 55, 55 is shown in Figs. 2b, 3 and 6. The hold down plates 55, 55 have a serrated or tooth shape along their outer edges, as best seen in Fig. 2b, this shape corresponding approximately with the innermost short diagonal score lines 14d on the blank (see Fig. 13). The blank in this position in the machine is indicated by the numeral 58.

As the blank is clamped in place by the hold down plates 55, 55, the folding fingers 60 begin to move upwardly and the U-shaped breaker fingers 61 (see Figs. 1b, 6) are lowered into a position to strike and break the sheet material at the two short centrally located longitudinal score lines 14e between the cut lines 13. This ensures folding of the central strips 14a so that they will be forced easily through the slots 14b. During this time the outer ends of the blank are held down against the angle iron guide plates 39, 39 by the top guides 38, 38. The folding fingers 60 are the same on each side of the machine and each set is composed of three individual fingers fixed to the shaft 62. The shape of these fingers, somewhat like a flatiron, is shown in Figs. 6 to 9 and 12. As they move upwardly, the points of the three fingers 60 strike the blank near the central portion of the three longitudinal cut lines 13 of the blank. Thus, each of the fingers folds a pair of the short straps 14a upwardly and inwardly at the same time by reason of their tapered construction, rotating the straps of each pair in opposite directions.

Figure 7:
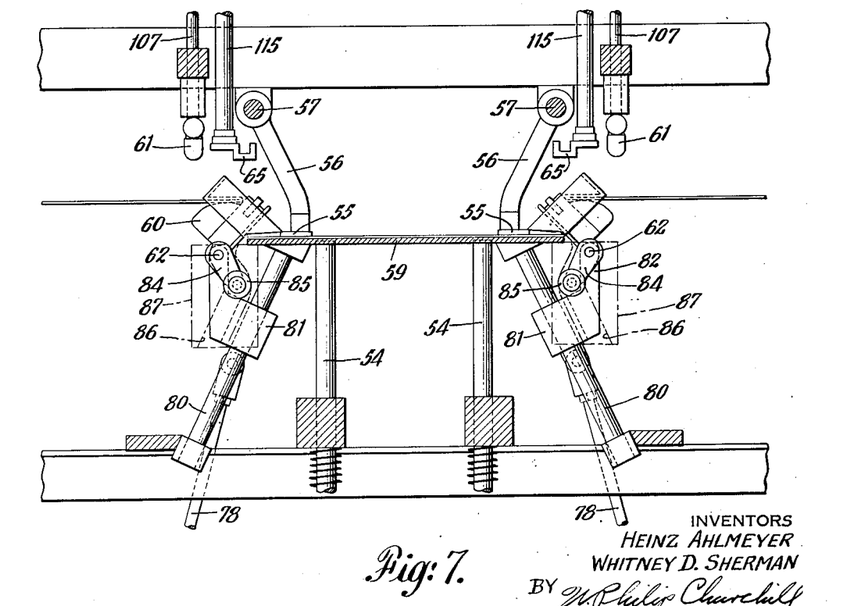

This insures folding of the straps along the score lines at each of the small triangular sections 14f and lifts the end or handle sections 10 of the blank upwardly, at the same time swinging them in toward the center of the machine. This movement of the blank in turn releases the outermost edges of the blank from underneath the guide rods 38. The final movement of these folding fingers 60 is an inwardly rocking motion during which the six upwardly extending cam shaped side plates 66 on the three fingers of each set force the central pairs of folded and rotated straps 14a through the two slots 14b and the two outermost straps around the outer edge of the blank, completing the formation of the square bottle pockets. The intermediate position of the folding fingers 60 is shown in Fig. 7 before this folding operation is completed. The completed operation performed by the fingers 60 and side plates 66 is shown in Fig. 8.

As soon as the fingers 60 actually begin to perform their folding operation, the U-shaped breaker bars 61 are raised and held in the raised position ready for the next blank. In the position shown in Fig. 8, the blank has been folded to form the bottle pockets between the raised handle sections and the lower central section of the blank.

Figure 8:
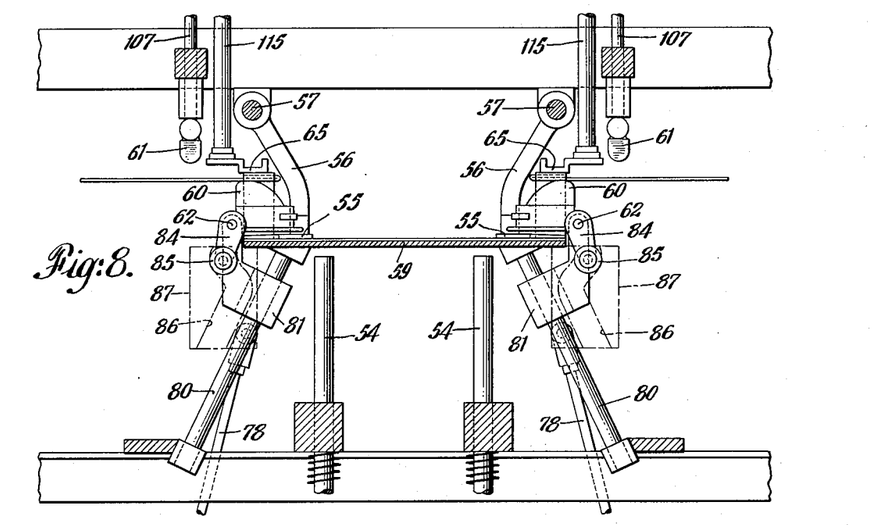
Figure 9:
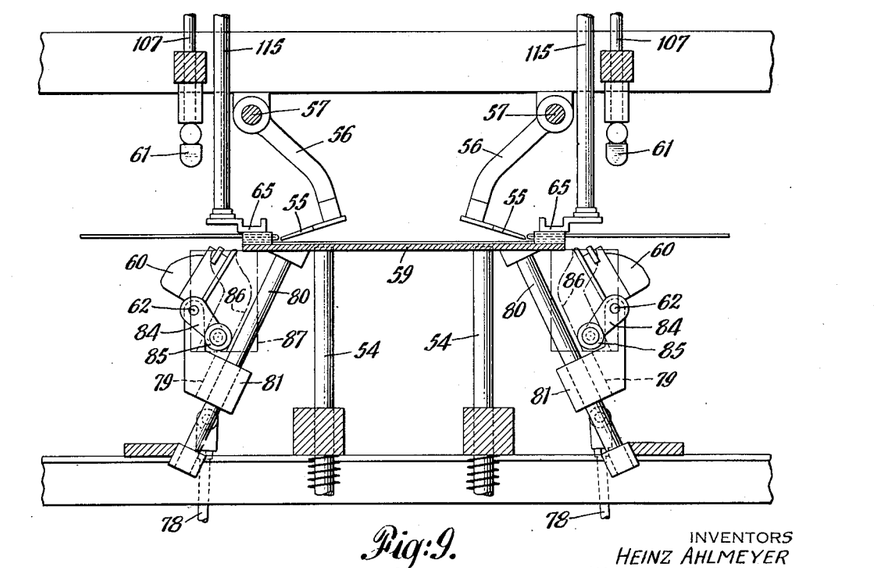

Also, by the time the folding operation just described has been completed, the stops 54, 54 have been pulled out of the way or lowered to the position shown in Fig. 8. The outer ends of the blank are no longer held by the plates 53, 53, so that at this stage the only thing holding the blank from continued forward movement is the hold down plates 55, 55. The folding fingers 60 are then quickly retracted, and as they are pulled out of the way, the hold down plates 55, 55 are rotated inwardly away from the central part of the blank to release it. Simultaneously, however, the creasing bars 65, 65 move down with a swinging motion toward the entrance end of the machine to flatten the folded sections so that the bottle pockets of the carrier are collapsed and the handle sections of the carton are offset from the central section. This collapsing or flattening forces the handle sections of the carrier toward the entrance end of the machine, and since the hold down plates 55, 55 release the blank almost simultaneously, the central section of the carton or blank is carried in the opposite direction by the friction belts 51 and 52, thus assisting the flattening or collapsing operation. These belts 51 and 52 are running continuously so that they serve to eject the blank from this folding station immediately upon completion of the folding operations just described. The folded blank in the collapsed position is shown in Fig. 9 just before it is released by the creasing bars 65, 65 and carried out of the folding station by the belts 51 and 52.

The various folding and other operations described are performed in timed sequence by a series of cams which may be operated as follows. A stub shaft 68 (Fig. 3) is driven in any suitable manner from the main drive shaft, and in turn drives at constant speed through the bevel gears 69 a short cam shaft 70 at right angles thereto. Shaft 70 in turn drives at the same speed a second short cam shaft 71 by means of the chain 72.

Fixed to the shaft 70, as seen in Fig. 3, is a large wheel 73 having a cam track 74 cut in the side thereof. Riding in the track 74 is a roller follower 75 carried by the horizontal bar 76, which in turn is mounted for vertical reciprocation on the fixed guide rods 77, 77. Pivotally attached to the horizontal bar 76 are operating rods 78, 78 which operate the folding fingers 60, as may be seen by referring to Figs. 6 to 9, and 12.

The upper ends of the operating rods 78, 78 are pivotally connected to the bars 79, 79, which are slidably mounted on pairs of fixed inclined guide rods 80, 80. Plates 81 having upwardly extending arms 82 are fixed to the ends of the bars 79, 79. The folding fingers 60 are attached to short bars or rods 83, 83, the ends of which are pivotally mounted in the upwardly extending arms 82 of the plates 81. The outer ends of the bars or rods 83, 83 have short arms or links 84, 84 fixed thereto and carry the cam followers or rollers 85, 85 which ride in the tracks 86, 86, cut in the fixed end plates 87, 87.

Thus, as the operating rods 78, 78 are moved up by the main operating cam 73, the folding fingers 60 are moved upwardly and inwardly in the general direction of the guide rods 80, 80. This movement starts the folding operation, allowing the points of the folding fingers to enter the openings between the cut lines of the blank. Continued upward movement of the rods 78 then brings the cam followers 85, 85 to a position at which the tracks 86, 86 change direction, so that as the fingers continue to move upwardly and inwardly they are rocked from the position shown in Fig. 7 to the position shown in Fig. 8. This motion of the fingers and their side plates 66 completes the operation of rotating and pressing the folded side strips 14a of the bottle pockets in the carton through the slots 14b in the lower portions of the handle sections of the blank. At the same time the lower surfaces of the folding fingers 60 complete the folding operation of the ends of the strips 14a adjacent the central section of the blank by pressing those sections down around the hold down plates 55, 55.

Referring again to Fig. 3, a second cam 90 is also mounted on the shaft 70 and operates a cam follower 91 carried by the short horizontal bar 92. The rods or stops 54, 54 are fixed to this short horizontal bar 92 and are mounted to slide up and down in the frame of the machine. Thus, the cam 90 serves to move the rods or stops 54, 54 up or down in proper timed sequence with the operation of the other elements. Springs 93, 93 serve to hold the follower 91 against the cam 90.

Referring now more particularly to the cams mounted on the shaft 71 as seen in Figs. 1b and 3, cam 95 is in contact with the roller or follower 96 carried by the rod 97, the lower end of which is bifurcated and straddles the shaft 71. The upper end of rod 97 is pivotally attached to one arm of a bell crank 98 mounted on the stub shaft 99. The other end of the crank 98 is connected by the link 100 to a smaller crank arm 101 fixed to the shaft 102. The shafts 99 and 102 have arms 103, 104 fixed to them which are connected through links 105 and 106 to the rods 107, 107 carrying the U-shaped striker fingers 61, 61. Thus, rotation of the cam 95 serves to raise and lower in proper sequence the U-shaped fingers 61, 61.

Also carried by shaft 71 is a cam 110 which operates the follower or roller 111 carried by rod 112. Rod 112 likewise has its lower end bifurcated to straddle the shaft 71. The upper end of the rod 112 is pivotally attached to the short crank arm 113 fixed to the shaft 114.

The two creasing bars 65, 65 are carried on the lower ends of rods 115, 115, and these rods in turn are pivotally attached to the ends of arms 116, 116 fixed to shaft 114, and the arms 117, 117 carried by shaft 118. This parallel linkage causes creasing bars 65, 65 upon downward movement of the operating rod 112 to swing downwardly and outwardly through an arc so that the bottle pockets of the folded carton are collapsed with a swinging or rocking movement.

The third cam 120 mounted on the shaft 71 operates a follower 121 carried by the rod 122 having a bifurcated lower end 123 to straddle the shaft 71. Operating rod 122 is pivotally connected to the crank 124 fixed to the shaft 125. Also carried by the shaft 125 are bevel gears 126, 126 meshing with the bevel gears 127, 127 carried on the stub shaft 57, 57. Thus, the hold down feet 55, 55 carried on the arms 56, 56 are caused to swing into and out of clamping position at the proper times by upward and downward motion of the operating rod 122 controlled by cam 120.

Figure 10:
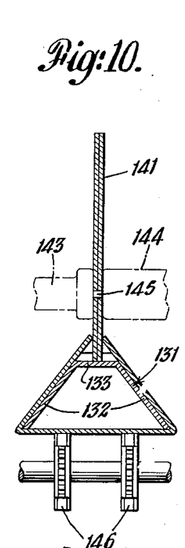
Figure 11:
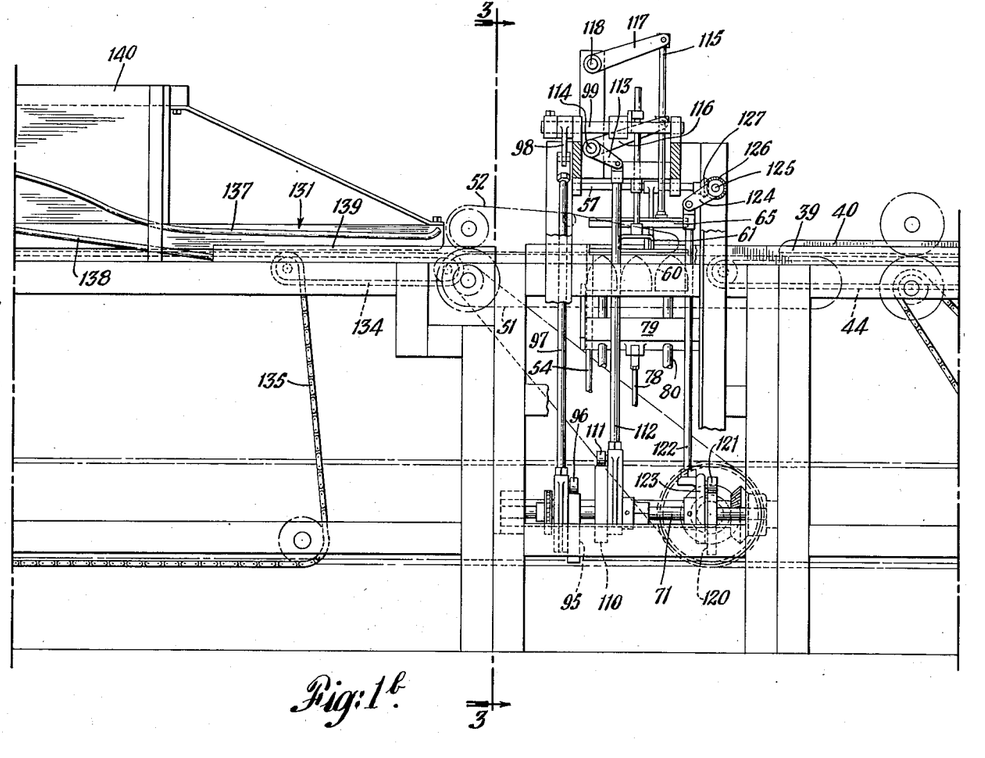
Figure 12:
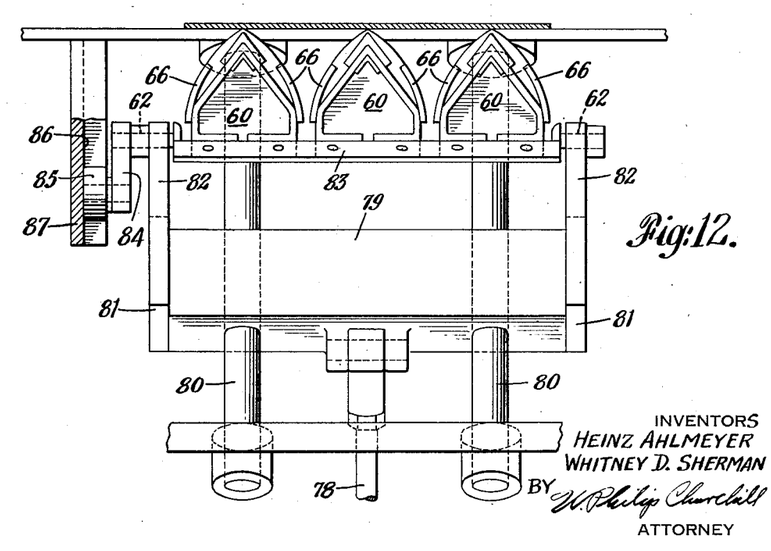
Fig. 12 is a side elevation view, on an enlarged scale, of one set of folding fingers and associated parts that form the bottle pockets in the carton.

When the folding operations just described are completed and the hold down feet 55, 55 and creaser bars 65, 65 release the blank, the partly folded blank is immediately carried out of the central folding station by the friction belts 51 and 52. The short additional friction belts 130, 130 may be used to assist the movement of the blank by the principal friction belts 51, 52. As the folded blank leaves these friction belts, the central portion of the blank is forced under a central mandrel, indicated generally at 131, and having a shape in cross section as shown in Fig. 10. Essentially, this mandrel consists of inclined side walls 132, 132 connected at their upper edges by a short horizontal wall 133. The side walls 132, 132, and particularly the lower edges thereof, are used to perform the next folding operation. At this point the feeding of the blank is accomplished first by the short transfer chains 134, 134 and then by the longer feed chains 135, 135 provided with suitable feeding dogs and driven from the auxiliary drive shaft 136 connected to the motor. The chains 134, 134 and 135, 135 move at the same speed as the preceding feed chains, which speed is substantially less than the speed of the friction belts 51 and 52. As the central portion of the blank is fed under the mandrel 131, the folded side sections are fed between the upper guide rods 137, 137 and lower guide rods 138, 138. The outer or handle sections of the partially folded blank during this operation are supported on the guide bars 139, 139.

Figure 2A:
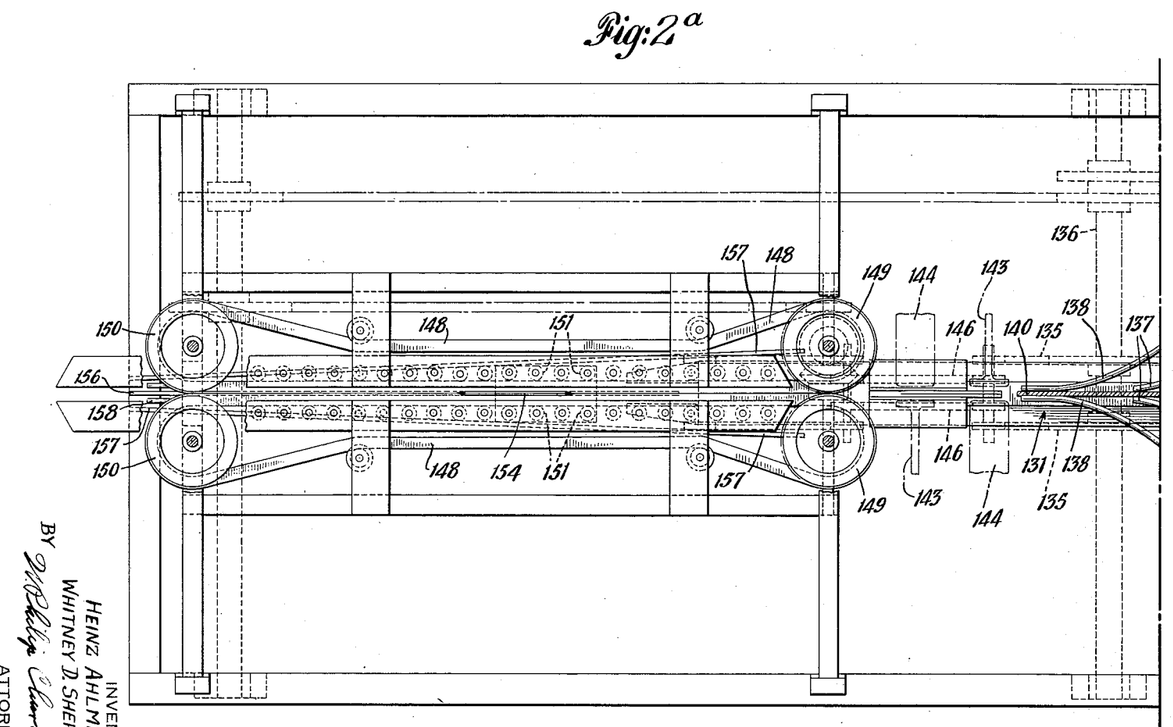

It will be noted that as the partially folded blank moves forward in the machine, the rods 138, 138 are inclined inwardly and upwardly until they meet against the vertical central plate 140 (see Fig. 2a). The guide rods 137, 137 are similarly inclined upwardly and inwardly until they meet adjacent the plate 140 at a point in advance of the meeting of the guide rods 138, 138. Thus, as the blank is fed forward, the guide rods 138, 138 raise the handle and folded portions of the blank on each side, folding the blank along its spaced central transverse score lines about the central mandrel 131. This folding operation is continued through an angle greater than 90° until the handle sections of the blank are brought flat together on opposite sides of the plate 140. During this operation the guide rods 137, 137 prevent the folded bottle pocket sections of the blank from opening out unduly and causing a possible interference with the subsequent operations of the machine.

By referring to Figs. 1a and 2a, it will be noted that the central vertical wall 140 terminates immediately after the guide rods 138, 138 bring the handle sections of the blank together. The feed chains 135, 135 move the blank in this position until it has just cleared the end of the central plate 140 with the handle portions together and is forced between opposing stapling devices and anvils. The feed chains 135, 135 terminate at this point so that as the blank arrives between these stapling devices and anvils its forward movement is momentarily stopped. At this point the blank is in the position indicated by the numeral 141 (see Figs. 1a and 10), and the handle sections of the carton are fastened together by suitable stapling means. This portion of the apparatus is shown only diagrammatically since it will be understood by those skilled in the art that various types of stapling devices may be used.

As illustrated, the handle portions of the carton are located between the anvils 143, 143 and the opposed stapling devices 144, 144. These stapling devices may be operated in timed sequence by an electric switch, a cam or in any suitable manner to apply the two staples 145 through both sections of the handle or carrying portion of the carton as soon as the blank reaches the proper position.

As soon as this stapling operation is completed, the carton is moved forward again by the feed chains 146, 146, each of which is provided with but a single feed dog 147. These chains, being operated at the same speed as the feed chains preceding them, permit the carton to pause for the stapling operation before the feed dog 147 comes around to pick up and advance the carton to the next operation. As soon as the stapling operation is completed, the dogs 147 on feed chains 146, 146, move the carton out of the stapling position far enough for the friction belts 148, 148 to continue the advancing or feeding of the folded carton.

The two friction belts 148, 148 are passed around a pair of driven pulleys 149, 149 mounted on short parallel vertical shafts and around idler pulleys 150, 150 also mounted on short vertical shafts. The driven pulleys 149, 149 may be driven from one of the auxiliary drive shafts connected to the motor by any suitable arrangement of chains and gears. The two friction belts 148, 148 thus form a straight line path where they come together for advancing the carton. In order to insure a firm grip of these friction belts on the carton, suitable backing idler rollers 151 may be provided on the sides of the belts 148, 148 where the belts grip the carton. These backing rollers prevent these belts from springing apart and losing their grip on the carton. It will be noted that these belts grip the upper or handle portions of the carton above the folds composing the bottle pockets formed at the central folding station. The lower portion of the carton at this stage is still shaped around and sliding on the mandrel 131.

The belts 148, 148 tend to move the carton forward at a substantially higher rate of speed than the feed chains 147, 147. However, the lower portion of the carton is held against this more rapid forward movement by means of reverse or holding dogs 152 on the chains 153, 153 which are driven and moving at the same speed as the feed chains 146. Thus, as the carton enters the passageway between the belts 148, 148, the upper portion is advanced rapidly and the lower portion is prevented from advancing as fast, with the effect that the side strips 14a forming the side walls of the bottle pockets swing outwardly and the lower portion of the carton is collapsed against the sides in the opposite direction from the collapsing performed by the creaser bars 65, 65. In other words, the relative positions of the upper or carrying portion of the carton and the lower portion of the carton are reversed or changed from the position indicated by the numeral 141 to that of the position shown at 154. This takes the spring out of the carton material at the fold lines forming the bottle pockets, making the carton easier to handle when bottles are loaded into it.

As soon as the folds of the carton are reversed by this operation, the lower portion of the carton slides off the end of the mandrel 131 and the central section of the carton begins to slide over an inclined centrally located vertical plate 156 which forces upwardly the central portion of the carton about the central transverse score line. By the time this operation begins, the carton has moved past the chains 153, 153 with their holding dogs 152. At the same time that the center of the carton is forced upward, the outer corners of the lower section of the carton are confined between the plates 157, 157, and as the carton continues to advance, these plates 157, 157 are brought gradually together to complete the folding or collapsing of the central section of the carton blank.

Thus, the carton emerges from between the belts 148, 148 at the delivery end of the machine in fully folded and collapsed position ready for shipment or for the customer to use. As the cartons are ejected at the delivery end of the machine by the belts 148, 148 they may be handled in any suitable fashion by stacking or other similar known devices. Also, during the passage of the carton between the belts 148, 148 the folding of the bottom portion of the carton and the formation of the carton into its finished collapsed form is assisted by the converging guide rods 158, 158 located approximately on a line with the folds forming the bottle pockets.

It will thus be seen that the apparatus of our invention converts a flat blank of sheet material into a folded and collapsed bottle carrying carton with only four main folding operations. These operations are (1) the formation of the flat blank with the two double folds as seen in Fig. 5; (2) the formation of the folded bottle pockets of the carton together with the locking of these pockets in place and collapsing of them; (3) bringing the two handle sections together and fastening them in this position; and (4) reversing the collapsed position of the bottle pockets and completing the folding of the base of the carton in collapsed form.

It will be noted that these operations are carried out by the machine with only two pauses or stops in the forward movement of the blank through the machine. These consolidations of operations make it possible to fold the blanks into finished cartons at a high rate of speed. Also, it is apparent that by feeding the blank through the machine in a direction at right angles to the longitudinal axis of the elongated blank, the first two operations can be performed simultaneously on each side of the blank without any waste of time and without interfering with the travel of the blank through the machine.

Other features of this apparatus which contribute importantly to the high speed production of a truly finished product are the fact that the bottle pockets of the carton are folded directly into a collapsed form and this collapsed form is reversed to take the spring out of the sheet material. This makes it much easier to pack the cartons for shipment directly as they come out of the machine and it also provides the cartons in a form which can be used immediately and easily by the consumer.

It will be understood that although a number of separate feed chains and other feeding means have been described in connection with the embodiment of the machine illustrated in the drawings, these various feeding devices may if desired be consolidated to some extent to simplify this phase of the operation. Various other mechanical equivalents can of course be used in place of certain of the folding and other operations illustrated and described.

The terms and expressions which we have

We claim:

1. A method of folding an elongated rectangular blank of sheet material having cut and score lines therein to form a bottle carrying carton which comprises forming said blank with transverse folds at spaced points intermediate the ends thereof, folding the blank adjacent said folds along score lines adjacent said cut lines to form bottle pockets, folding and securing together the outer ends of said blank with the pockets on the outer sides thereof, and folding the central portion of the blank to permit collapsing of the carton.

2. A method of folding an elongated rectangular blank of sheet material having cut and score lines to form a bottle carrying carton which comprises moving said blank in a direction at right angles to its longitudinal axis and during such movement successively forming said blank with double transverse folds at spaced points intermediate the ends thereof, folding the blank adjacent said folds along said score lines to form bottle pockets, and folding the outer ends of said blank together to form a bottle carrying carton in collapsed position.

3. Apparatus for folding an elongated blank of sheet material to form a bottle carrying carton which comprises means for feeding said blank through said apparatus in a direction at right angles to the longitudinal axis of the blank, means for forming transverse folds in said blank at spaced points intermediate the ends thereof, means for forming bottle pockets in said blank adjacent said folds, and means located at a station of the apparatus following said bottle pocket forming means for folding and securing together the outer ends of said blank with the bottle pockets on the outer sides thereof.

4. A machine for folding an elongated blank of sheet material to form a bottle carrying carton which comprises means for feeding said blank through said folding machine in a direction at right angles to the longitudinal axis of the blank, means for forming simultaneously two transverse folds in said blank at points spaced from the outer ends thereof, means for forming simultaneously two sets of bottle pockets in said blank adjacent said folds, and means located at a station of the machine following said bottle pocket forming means for folding and securing together as a handle section the outer ends of said blank with the bottle pockets on the outer sides thereof.

5. Apparatus for folding an elongated blank of sheet material to form a bottle carrying carton which comprises means for feeding said blank through said apparatus, means for forming two sets of bottle pockets in said blank and collapsing said pockets between adjacent portions of the blank, means for folding and securing together to form a handle section the ends of said blank with said collapsed pockets on the outer sides thereof, and means for reversing the collapsed position of said pockets relative to said handle section.

6. Apparatus for folding an elongated blank of sheet material to form a bottle carrying carton which comprises means for feeding said blank through said apparatus, means for forming two sets of bottle pockets in said blank and collapsing said pockets between adjacent portions of the blank, means for bringing and securing together the ends of said blank to form a handle section while preventing the central section of the blank, means for bringing and securing together the collapsed position of said pockets relative to said handle section while said central section of the blank is held in the uncollapsed position.

7. A machine for folding an elongated blank of sheet material to form a bottle carrying carton which comprises means for feeding said blank through said folding machine, means for forming two sets of bottle pockets in said blank and collapsing said pockets between adjacent portions of the blank, means for folding and securing together to form a handle section the ends of said blank with said collapsed pockets on the outer sides thereof, and feeding means for advancing the handle section faster than the central portion of the blank to reverse the collapsed position of said pockets.

8. In apparatus for folding an elongated rectangular blank of sheet material to form a bottle carrying carton, means for forming bottle pockets by folding portions of said blank divided by cut lines into strips extending longitudinally of the blank which comprises a set of folding fingers, means for moving said fingers with a forward rocking motion, each of said fingers tapering laterally and vertically to a point and being positioned so that said points first strike the blank along said cut lines, and means for striking score lines between said cut lines in timed relation to said moving means to start the folding of said strips properly by said fingers.

9. In apparatus for folding an elongated rectangular blank of sheet material to form a bottle carrying carton, means for forming upright bottle pockets by folding portions of said blank divided by cut lines into strips extending longitudinally of the blank which comprises a set of folding fingers, means for moving said fingers with a forward rocking motion, each of said fingers tapering laterally and vertically to a point and being positioned so that said points first strike the blank along said cut lines, and creaser bars for collapsing said bottle pockets with a downwardly and sideways motion as soon as said pockets are formed by said fingers.

10. In apparatus for folding an elongated rectangular blank of sheet material to form a bottle carrying carton, means for forming upright bottle pockets by folding portions of said blank divided by cut lines into strips extending longitudinally of the blank which comprises a set of folding fingers, means for moving said fingers with a forward rocking motion, said fingers being positioned to strike the blank along said cut lines, means for clamping the central portion of the blank in fixed position along diagonal score lines adjacent said central portion, means for striking score lines between said cut lines to start the folding of said strips properly by said fingers, and creaser bars for collapsing the upright bottle pockets with a downward and sideways motion after said pockets are formed by said fingers.

11. In a method of forming a bottle carrying carton from an elongated rectangular sheet of material having intermediate its ends short longitudinal cut and score lines therein separating strips therebetween, short transverse and diagonal score lines at the ends of said strips and slots extending into an end portion on a line with said longitudinal score lines, the steps which comprise rotating pairs of said strips to form relatively square bottle pockets therebetween, and forcing said strips through said slots and around the outer ends of the sheet to lock them in place.

12. In a method of forming a bottle carrying carton from an elongated rectangular sheet of material having intermediate its ends short longitudinal cut and score lines therein separating strips therebetween, short transverse and diagonal score lines at the ends of said strips and slots extending into an end portion on a line with said longitudinal score lines, the steps which comprise rotating pairs of said strips to form relatively square bottle pockets therebetween, and forcing said strips through said slots and around the outer ends of the sheet to lock them in place while the central portion of the blank is held by a clamp along the innermost diagonal score lines.

13. In a method of forming a bottle carrying carton from an elongated rectangular sheet of material having intermediate its ends short longitudinal cut and score lines therein separating strips therebetween, short transverse and diagonal score lines at the ends of said strips and slots extending into an end portion on a line with said longitudinal score lines, the steps which comprise rotating pairs of said strips to form relatively square bottle pockets therebetween, forcing said strips through said slots and around the outer ends of the sheet to lock them in place, collapsing said bottle pockets with a sideways motion, and creasing said pockets in the collapsed position.

14. In a method of forming a bottle carrying carton from an elongated rectangular sheet of material having intermediate its ends short longitudinal cut and score lines therein separating strips therebetween, short transverse and diagonal score lines at the ends of said strips and slots extending into an end portion on a line with said longitudinal score lines, the steps which comprise rotating pairs of said strips to form relatively square bottle pockets therebetween, forcing said strips through said slots and around the outer ends of the sheet to lock them in place, collapsing said bottle pockets with a sideways motion, creasing said pockets in the collapsed position, and reversing the collapsing of said pockets to take the spring out of the sheet material at the creased folds.

15. Apparatus for folding an elongated rectangular blank haivng cut and score lines to form a bottle carrying carton which comprises means for forming the blank into a flattened position having a pair of double transverse folds spaced from the ends of the blank, means for forming sets of bottle pockets adjacent said folds and simultaneously raising the ends of the blank above the level of the central portion thereof, means for collapsing the carton to a flattened position by moving the end portions laterally of said central portion, means for bringing said end portions together to form a handle section for the carton, and means for reversing the laterally offset position of said end and central portions to take the spring out of the blank material at the fold lines around said pockets.

HEINZ AHLMEYER.
WHITNEY D. SHERMAN.

REFERENCES CITED

The following references are of record in the file of this patent:

UNITED STATES PATENTS

| Number | Name | Date |
| --- | --- | --- |
| 2,308,394 | Slevin | Jan. 12, 1943 |
| 2,337,803 | Deline | Dec. 28, 1943 |